United States Patent [19]
Noltemeyer et al.

[11] Patent Number: 5,421,293
[45] Date of Patent: Jun. 6, 1995

[54] PORT-CONTROLLED TWO-STROKE INTERNAL COMBUSTION ENGINE

[75] Inventors: Friedrich Noltemeyer, Waiblingen; Jürgen Lang, Backnang; Klaus Meier, Leutenbach; Friedrich Rusch, Stuttgart; Günter Karl, Esslingen; Frank Duvinage, Kirchheim, all of Germany

[73] Assignee: Mercedes-Benz AG, Stuttgart, Germany

[21] Appl. No.: 272,831

[22] Filed: Jul. 11, 1994

[30] Foreign Application Priority Data

Jul. 10, 1993 [DE] Germany ............... 43 23 158.6
Jul. 10, 1993 [DE] Germany ............... 43 23 157.8

[51] Int. Cl.⁶ ............................................. F02B 33/12
[52] U.S. Cl. ........................... 123/74 AC; 123/197.3
[58] Field of Search ............ 123/74 AC, 197.3, 197.4; 384/11; 92/140

[56] References Cited

U.S. PATENT DOCUMENTS 877,589  1/1908  Oulton ........................ 123/74 AC

FOREIGN PATENT DOCUMENTS 1091996  4/1955  France .
534251  9/1931  Germany ................... 123/74 AC
3206152  8/1983  Germany .
4206122  10/1992  Germany .
119157  10/1918  United Kingdom .
1036552  7/1966  United Kingdom .

OTHER PUBLICATIONS

KSZ 90/160 of MAN from "Design and Principal Dimensions of the Internal Combustion Engine", Harald Maass, Springer Verlag 1979, p. 214, FIG. 5.62.

Primary Examiner—Noah P. Kamen
Attorney, Agent, or Firm—Klaus J. Bach

[57] ABSTRACT

In a port-controlled two-stroke internal combustion engine with an engine block comprising a crankcase and a cylinder block including pistons connected to a crankshaft by crosshead rods with crossheads guided for linear movement with the pistons, and connecting rods extending between the crossheads and the crankshaft a partition structure is arranged between the crankcase and the cylinder block and includes hollow cylindrical sleeves which project axially into the cylinders to a point closely adjacent the undersides of the piston tops when the pistons are in their bottom dead center positions and the sleeves are spaced from the cylinder walls to form between the sleeves and the cylinder walls annular spaces for receiving the depending skirts of the pistons.

7 Claims, 1 Drawing Sheet

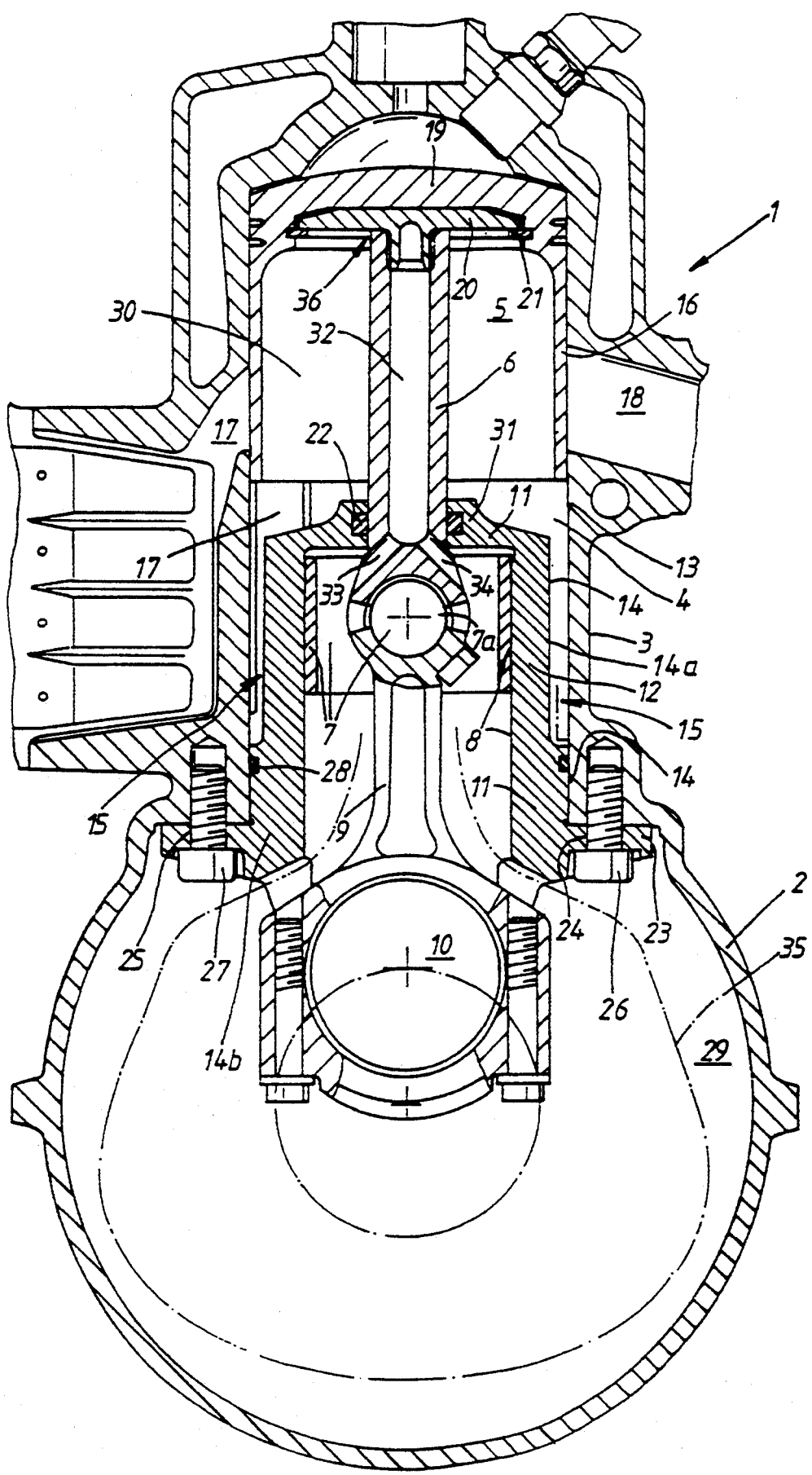

PORT-CONTROLLED TWO-STROKE INTERNAL COMBUSTION ENGINE

BACKGROUND OF THE INVENTION

The invention relates to a port-controlled two-stroke internal combustion engine with a piston having a crosshead movable therewith and a connecting rod extending between the crosshead and a crankshaft for transferring motion from the piston to the crankshaft.

A port-controlled two-stroke internal combustion engine of this type is already known (KSZ 90/160 of MAN) from the German book "Gestaltung und Hauptabmessungen der Verbrennungskraftmaschine", Harald Maass, Springer Publishing Co., 1979, p. 214, FIG. 5,62'. The crosshead engine has an engine block with a crankcase and a cylinder block with a cylinder in which a piston acts on a crankshaft by way of a crosshead rod, a crosshead with crosshead guide and a connecting rod. Between the crankcase and the cylinder block there is a partition which includes a sleeve protruding into the cylinder from the crankcase. In the bottom dead center region of the piston, the piston skirt is partially received between the outer contour of the sleeve and the inner contour of the cylinder.

For general background, reference is made to German Patent Specification 33 27 225 and German Offenlegungsschrift DOS 32 06 152.

A disadvantage of internal combustion engines this type is their large design height because, in this respect, the three heights of the piston stroke, the crosshead stroke and the piston height are normally additive. In addition, the piston skirt is relatively long in the case of port-controlled two-stroke internal combustion engines because, in the upper dead center position of the piston, it must be able to cover and close the ports located in the bottom dead center region of the piston.

In addition to the cost disadvantages resulting from the large design height, there are weight and space disadvantages and these are particularly serious in the case of passenger car engines.

A further disadvantage of internal combustion engines of this type are the large oscillating masses because, due to the large design height, the crosshead rod and the connecting rod have also to be made relatively long and therefore are relatively heavy.

In internal combustion engines of the generic type, furthermore, the rigid connection between the piston and the crosshead rod is a disadvantage because the rigid connection demands exact alignment of the piston guide with the sliding guide track of the crosshead. In the case of large diesel engines, which are produced in small numbers by individual manufacture, this alignment is achieved by matching the cooperating members for each individual cylinder. However, matching of the cooperating members (piston and crosshead guide) or each cylinder individually is too expensive for engines which are manufactured by mass production procedures.

It is therefore the principal object of the invention to provide an internal combustion engine of the described type with the smallest possible design height and lowest possible weight which can be manufactured in a simple manner and at favorable costs.

SUMMARY OF THE INVENTION

In a port-controlled two-stroke internal combustion engine with an engine block comprising a crankcase and a cylinder block including pistons connected to a crankshaft by crosshead rods with crossheads guided for linear movement with the pistons, and connecting rods extending between the crossheads and the crankshaft a partition structure is arranged between the crankcase and the cylinder block and includes hollow cylindrical sleeves which project axially into the cylinders to a point closely adjacent the undersides of the piston tops when the pistons are in their bottom dead center positions and the sleeves are spaced from the cylinder walls to form between the sleeves and the cylinder walls annular spaces for receiving the depending skirts of the pistons.

One advantage of the two-stroke internal combustion engine in accordance with the invention resides in a substantial reduction in the design height compared with the prior art engines. Substantial cost, space and weight advantages are achieved as a result of the small design height so that port-controlled two-stroke crosshead internal combustion engines, which have previously been built mainly for marine diesel and comparable large drive systems, can now be reasonably employed as passenger car engines.

Furthermore, the oscillating masses in the internal combustion engine according to the invention are substantially smaller than those of previously known engines of this type so that smaller counterweights are necessary on the crankshaft and/or on the counterbalance shaft.

A further reduction in mass of the two-stroke internal combustion engine according to the invention is provided by the relatively small crosshead and crosshead guide sizes due to the present design. Both are located mainly within the cylinder and therefore have a smaller diameter than the cylinder.

The advantageous configuration of the invention in which the sleeve extending into the cylinder is circular in cross-section is a preferred embodiment which can be manufactured at particularly low costs. In addition the arrangement causes generation of relatively little noise as a result the cylindrical configuration of the crosshead guide because the tipping noise on each change of attitude of the crosshead is smaller than in the case of known arrangements of this type of engine because there is little bearing clearance and it remains substantially the same over the full load range of the engine.

The design height is as low as possible if the connecting rod is only long enough that, in the bottom dead center position of the piston, the underside of the piston front face is just above the cover of the guide sleeve and the piston skirt is received deeply in the annular space provided between the sleeve outer contour and the cylinder, Preferably the crosshead rod is hollow providing for an oil passage used for oil cooling of the piston by means of oil sprayed from the oil circuit onto the lower surface of the top of the piston.

If in accordance with the invention the piston is connected to the crosshead rod so as to be radially movable relative thereto the very costly requirement for matching of the piston guide (cylinder running surface) and the crosshead guide for each individual cylinder is eliminated. It is then sufficient to align the two running partners parallel to one another. Compensation is provided for their lateral offset by a radial motion capability of the piston relative to the crosshead rod and restraint-free guidance of the piston is therefore ensured.

A further advantage of this embodiment is that a relatively flat support plate, which is permanently connected axially to the crosshead rod and which can be integrated into the top of the piston, can be used as the connecting piece so that the design height of the internal combustion engine is not appreciably increased by the connecting piece between the piston and the crosshead rod.

For manufacturing technology reasons, a preferred embodiment of the invention is an arrangement in which the radial motion of the piston is at least equal to the sum of the tolerances of the respective cylinder distance in the engine block.

Further embodiments and advantages of the invention will become apparent from the following description wherein the invention is explained in greater detail in connection with the sole drawing.

BRIEF DESCRIPTION OF THE DRAWING

The sole FIGURE shows a port-controlled two-stroke internal combustion engine.

DESCRIPTION OF THE PREFERRED EMBODIMENT

As shown in the FIGURE the engine comprises an engine block 1, which includes a crankcase 2 with a crank space 29 and a cylinder block 3 with cylinder 4 and working space 30. In the cylinder 4, a piston 5 acts on a crankshaft 10 by way of a crosshead rod 6, a crosshead 7 with crosshead hinge 7a and a crosshead guide 8 and a connecting rod 9.

A partition structure 11 fastened to the engine block 1 is arranged between the crankcase 2 and the cylinder block 3 and this partition structure 11 includes a cup-shaped sleeve 12 which is open towards the crankcase and extends into the cylinder 4 from below where it is fastened to the cylinder block 3. There is a clearance between the inner contour 13 of the cylinder 4 and the outer contour 14 of the sleeve 12 so that an annular space 15 is formed in which the piston skirt 16 of the piston 5 can be received.

The crosshead guide 8 in the sleeve 12 has a cylindrical configuration preferably with circular cross-section. The upper part 14a of the outer contour 14 of the sleeve 12 however preferably has an oval configuration for air guidance and strength reasons. In the figure, the sleeve 12 is shown cut through its thickest cross-section the sleeve 12 is much thinner in a cross-sectional plane normal to that of the drawing. The lower part 14b of the outer contour 14 of the sleeve 12 has a cylindrical configuration and is centered in the cylinder 4.

The inlet ports 17 and the exhaust ports 18, which are used for changing the cylinder charge and which are controlled by the piston skirt 16, are located in the cylinder block 3. It can be seen that the piston skirt 16 closes the inlet ports 17 and the exhaust ports 18 in its top dead center position.

The piston 5 is connected to the crosshead rod 6 by means of a connecting piece 36 so that it can be rotated and displaced radially but is axially fixed. The connecting piece 36 includes a support plate 20, which is fastened to the upper end of the crosshead rod 6 and on which the lower surface the top 19 of the piston is seated, and a locking ring 21 which firmly engages the piston 5 with the support plate 20. The engagement insures that the piston 5 is also moved during the starting phase of the engine. When the engine is in operation, the gas forces and the mass forces always load the piston 5 in the direction towards the support plate 20.

The radial mobility of the piston 5 relative to the crosshead rod 6 amounts to at least the tolerance of the respective cylinder distance in the engine block 1 (crankcase 2 and cylinder block 3) which is normally some tenths of a millimeter.

The rotatability of the piston 5 in the connecting piece 36 permits, inter alia, compensation for one-sided heating of the piston which results from the outward flow of the exhaust gases into the exhaust passage 18 over the piston region at the exhaust passage end.

The cylindrical crosshead guide structure 8 is formed in the sleeve 12 wherein the crosshead 7 is guided parallel to the axis of the cylinder. The crosshead rod 6 extends from the crosshead 7 towards the piston 5 through the end wall 31 of the sleeve 12 so as to be axially movable therein. There is a seal 22 between the end wall 31 and the crosshead rod 6.

At its end facing towards the crankcase 2, the sleeve 12 has a rim 23 with holes 24 and 25 through which fastening bolts 26 and 27 extend by means of which the sleeve is bolted to the engine block 1. A seal 28 (for example, an 0-ring) is arranged in the lower region of the sleeve 12 between the latter and the cylinder 4.

The crank space 29 is sealed against the working space 30 by means of the seals 22 and 28. This separation the spaces 29 and 30, known in principle in crosshead internal combustion engines, has the effect that, in contrast to the crankcase scavenged two-stroke internal combustion engines, proven friction bearings lubricated by pressurized oil can be used for all the engine bearings instead of antifriction roller or ball bearings, which cannot be subjected to such high loads and which cause noise. Further, as a result the back of the piston can still act as a scavenging pump. The piston 5 is substantially free from side forces because of the crosshead guide 8 and it therefore only requires slight lubrication.

Because of the relatively short crosshead rod 6, the crosshead hinge 7a is located in such proximity of the piston 19 that, in the bottom dead center position (not shown) of the piston 5, there is only space for the crosshead rod seal (seal 22) in the end wall 31 of the sleeve 12. Consequently, the lower part of the cylinder 4 adjacent the piston skirt 16 when in its bottom dead center position extends over a large part of the crosshead guide sleeve 12 so that a substantial reduction in the design height is achieved.

There are good lubrication conditions and almost constant bearing clearances in the cylindrical crosshead guide structure 8 which easily accommodates the side forces caused by the oblique position of the connecting rod 9 and, for this reason, when the piston is between its top and bottom dead center positions the connecting rod 9 can be made substantially shorter than it normally is in port-controlled two-stroke internal combustion engines. Despite the short connecting rod 9 (approximately 1.5 times the stroke), there is no appreciable increase in friction losses for the crosshead guide structure 8.

The crosshead rod 6 has a passage 32 which leads tom the crosshead 7 to the lower surface of the top 19 of the piston 5 for the purpose of oil-cooling the latter. This passage 32 is in communication with the crank space 29 by means of connecting passages 33 and 34.

The violin-shaped trace 35 of the connecting rod, i.e., the envelope curve of the respectively outermost points of the connecting rod 9 and the crankshaft 10 relative to the crankshaft center line during a revolution of the crankshaft, is shown as a dash-dotted line.

In a further embodiment of the invention, the sleeve 12 can also be cast integrally with the engine block instead of being bolted thereon. In addition, the crosshead guide can be arranged both in the cylinder block and in the crankcase of the engine block.

The connecting piece between the piston and the crosshead rod can also be different in design. For example, the piston may either by rotatably supported relative to the crosshead rod or, if a combustion space is partially integrated into the top of the piston, the piston is preferably secured against rotation. In addition, a union nut can be used instead of the locking ring in order to secure the support plate in place.

What is claimed is:

1. A port-controlled two-stroke internal combustion engine having an engine block including a crankcase and a cylinder block with at least one cylinder having a cylinder axis and a piston disposed in the cylinder so as to be movable between top and bottom dead center positions, said piston having a downwardly extending skirt, a crosshead and a crosshead rod connected to said piston for movement therewith, a crosshead guide structure supporting said crosshead for linear movement along the axis or said cylinder, a crankshaft supported in said crankcase and a connecting rod extending between said crosshead and said crankshaft for transferring motion from said piston to said crankshaft, a partition structure arranged between said crankcase and said cylinder block and being mounted thereon, said partition structure including a hollow cylindrical sleeve projecting axially into said cylinder and having outer contour walls disposed at a distance from the inner wall of said cylinder such that an annular space is formed therebetween of sufficient width and length that said piston skirt can at least partially be received therein, said sleeve defining, at its inner side, said crosshead guide structure which extends upwardly into said cylinder to a point which is surrounded by the skirt of said piston when said piston is in its bottom dead center position, piston being connected to said crosshead rod in an axially fixed manner, but being rotationally and radially displaceable relative to said crosshead rod by means of a connecting piece in order to permit compensation for any axial misalignment of the cylinder and the crosshead guide.

2. A port-controlled two-stroke internal combustion engine according to claim 1, wherein said crosshead guide structure within said sleeve is circular in cross-section.

3. A port-controlled two-stroke internal combustion engine according to claim 1, wherein said sleeve has an end wall at its top through which said crosshead rod extends and the length of, said crosshead rod is so selected that, in the bottom dead center position of, the piston, the lower surface of the top of the piston is located closely adjacent the top wall of said sleeve.

4. A port-controlled two-stroke internal combustion engine according to claim 1, wherein, for the purpose of oil-cooling the piston, the crosshead rod is hollow so as to form a passage which leads from the crosshead to the lower surface of the top of the piston and said passage is in communication with the crankcase space by means of connecting passages extending between the crosshead rod passage and the space enclosed by said sleeve.

5. A port-controlled two-stroke internal combustion engine according to claim 1, wherein said sleeve is bolted to the engine block.

6. A port-controlled two-stroke internal combustion engine according to claim 1, wherein said sleeve is cast integrally with the engine block.

7. A port-controlled two-stroke internal combustion engine according to claim 1, wherein manufacture of said partition structure with said hollow cylindrical sleeve and its installation in said block is effected within given tolerances and the radial mobility of the piston relative to the crosshead rod amounts to at least the sum of said tolerances.

* * * * *